United States Patent [19]

Tarr

[11] 3,916,115

[45] Oct. 28, 1975

[54] MULTIFREQUENCY SIGNAL PARITY DETECTOR

[75] Inventor: Lloyd A. Tarr, Elmhurst, Ill.

[73] Assignee: GTE Automatic Electric Laboratories Incorporated, Northlake, Ill.

[22] Filed: Mar. 4, 1974

[21] Appl. No.: 448,176

[52] U.S. Cl. .......... 179/84 VF
[51] Int. Cl.² .......... H04M 1/50
[58] Field of Search .......... 179/84 VF; 324/78 D

[56] References Cited

UNITED STATES PATENTS 3,140,357 7/1964 Bischof et al. .......... 179/84 VF
3,288,940 11/1966 Bennett et al. .......... 179/84 VF
3,770,900 11/1973 Morlec .......... 179/84 VF

*Primary Examiner*—Kathleen H. Claffy
*Assistant Examiner*—Joseph Popek
*Attorney, Agent, or Firm*—Robert J. Black

[57] ABSTRACT

A parity checking circuit for use in multifrequency tone receivers is disclosed wherein associated receivers are made less susceptible to digit simulation when talking is present, by verifying that the same two tones are present for the entire parity timing period.

7 Claims, 1 Drawing Figure

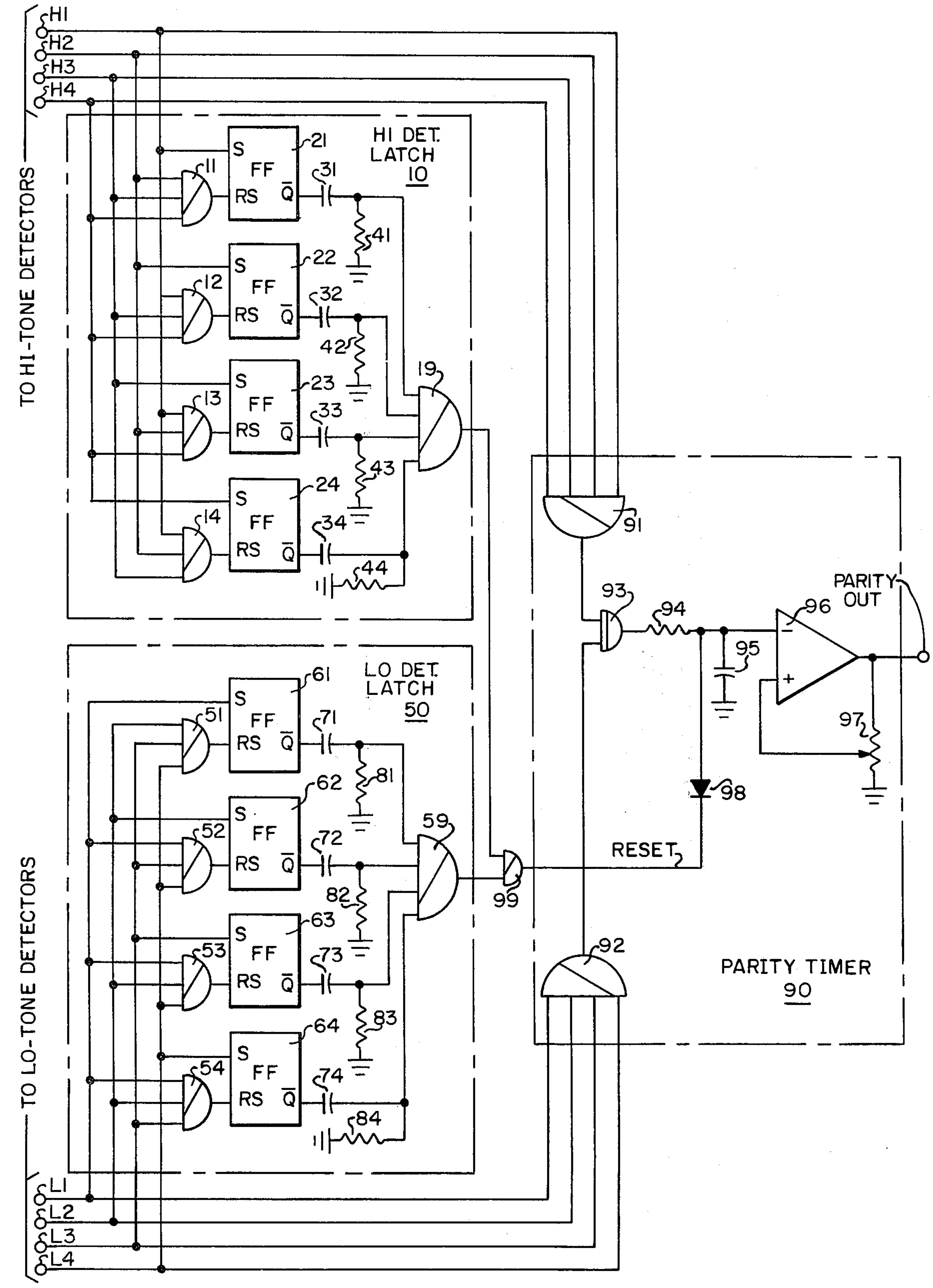
H1
H2
H3
H4
TO HI-TONE DETECTORS
HI DET. LATCH 10
S FF RS Q̄
21
22
23
24
11
12
13
14
31
32
33
34
41
42
43
44
19
LO DET. LATCH 50
61
62
63
64
51
52
53
54
71
72
73
74
81
82
83
84
59
99
TO LO-TONE DETECTORS
L1
L2
L3
L4
91
92
93
94
95
96
97
98
RESET
PARITY OUT
PARITY TIMER 90

MULTIFREQUENCY SIGNAL PARITY DETECTOR

BACKGROUND OF THE INVENTION

1. Field of the Invention

This invention pertains to multifrequency tone receivers as used in telecommunication systems and more particularly to an improved parity checking circuit for use with tone receivers.

2. Description of the Prior Art

Multifrequency signaling in telephone systems has become quite common because of the advantages provided over interrupted direct current signaling. The principle advantage of this type of system is the speed and accuracy with which a subscriber may operate a push button telephone subset. In such systems multifrequency signal bursts each indicative of a digit are generated at a telephone substation and received by a signal receiver. This signal receiver separates the component frequencies of the signal bursts and indicates their presence to register apparatus. The signal receiver also includes apparatus for timing a minimum signal duration before allowing signals to be registered. This prevents a false indication of a digit due to other voice frequency signals in the transmission network (including noise). At the end of the predetermined time interval the signal detecting apparatus is operated to provide an output to the register.

To guard against false outputs one method of tone decoding requires the presence of two valid tones for a certain minimum duration. The presence of such two valid tones is commonly called parity and a parity timer insures that the two tones are present for the required time.

In such multifrequency signaling systems it is common to utilize eight tones divided into two groups of four tones each. The low group is made up of the four lower tones and the high group made up of the four higher tones. A valid tone pair then is made up of one tone from each group. In many existing multifrequency receivers, the low group detector outputs are combined through an OR gate and the high group detector outputs are also combined through a different OR gate. These signals indicating that a detector in their group is on, are then fed into a common AND gate. A true output from the AND gate indicates that a tone from each group is present and a parity condition exists. Examples of this form of parity detection are found in U.S. Pat. No. 3,140,357 to W. Bischof et al and U.S. Pat. No. 3,288,940 to G. H. Bennett et al.

Another form of tone detector exemplified by U.S. Pat. No. 3,128,349 to F. P. Boesch et al teaches that once a tone is detected in either high or low group all other tones are inhibited for the duration of the timing period established by an associated timer. In this manner if a false signal is followed immediately by a valid signal, the valid signal may be missed.

In circuits like those described above, no means are present for insuring that the two tones being timed at the end of parity are the same two that initiated operation of the parity timer. For example if both high and low group detectors give outputs, the parity timer is started. If during pariity timing the high group detector for one tone, turns off and the high group detector for a second high group tone turns on before an interdigital pause is recognized, parity timing will continue and a valid parity detection will be made, even though the same two tones were not present for the required time.

It is the object of the present invention to provide circuitry to insure that the same two tones (one in each group) are present for the entire parity timing period.

SUMMARY OF THE INVENTION

In the parity circuit of the present invention a group of flip flop circuits are employed to form a small memory for each group in order to keep track of which detector from each group are on. Each detector output is fed into a latch circuit which is "set" when its detector turns on. If a different detector turns on, then the latch that is already on will be reset. The outputs of the latches are differentiated to produce a pulse at such time as they are reset. These reset pulses are combined through an OR gate, to form a reset signal indicating that a new detector has turned on. This reset signal occurs obviously only when a different detector turns on and not when the same detector turns back on.

It is this reset signal or pulse that is used to discharge a timing capacitor that forms a portion of the parity timer. When the capacitor is discharged, the parity timer starts timing from zero again. In this manner the same two tones must be present for an entire parity period.

DESCRIPTION OF THE DRAWING

The single sheet of the accompanying drawing is a combined logic and functional diagram of a parity checking circuit in accordance with the present invention.

It should be noted that certain portions of the circuit of the present invention are shown in logic form. The details of such circuitry do not form a portion of the present invention. Rather the only requirement be that they perform the function as described in the specification. They may be implemented with any well known form of such circuitry that provides such function.

DESCRIPTION OF THE PREFERRED EMBODIMENT

The improved parity checking circuit of the present invention is made up of a high group tone detecting latch circuit 10 and a low group tone detecting latch circuit 50. The inputs of latch 10 are connected to high tone group detectors such as disclosed in the aforementioned prior art patents. Likewise the low group latch circuit 50 has its inputs connected to four inputs from a low tone group of detectors similar to those found in the prior art.

The circuitry of both latch 10 and latch 50 are similar each consisting of four flip flop circuits, each having a set input connected to one of the tone detector outputs in the group to which the latch is connected. Each flip flop circuit also has a reset input connected to an OR gate with each OR gate connected to three of the tone detectors in the associated group excluding the tone detector connected to the associated set lead in the same flip flop.

The $\overline{Q}$ output only is utilized from each flip flop where it is connected to an associated differentiator consisting of a capacitor and resistor combination. The resulting outputs from all four flip flops after differentiation are connected to a common OR gate.

Referring now to the accompanying drawing it will be noted that latch 10 consists of flip flops 21, 22, 23 and 24, with the set inputs being connected to high tone detector terminal H1, flip flop 22 connected to H2, flip flop 23 to H3 and flip flop 24 to H4. Flip flop 21 reset input is connected through OR gate 11 to input terminals H2, H3 and H4 while flip flop 22 reset input is connected through OR gate 12 to input terminals H1, H3 and H4, etc. The low tone group detector latch is identical except that its inputs to the included flip flops 61, 62, 63 and 64 are connected to terminals L1, L2, L3 and L4 connected to the low tone group detectors.

As noted above each detector latch includes a common logic OR gate such as 19 or 59. Outputs from gates 19 and 59 are combined by OR gate 99 whose output provides the reset signal pulse to parity timer 90. Parity timer 90 includes two OR gates 91 and 92 connected to the high group terminals H1-H4 and low group terminals L1-L4 respectively. The outputs from gates 91 and 92 are combined at AND gate 93 whose output is connected through resistor 94 to timing capacitor 94 and the negative input of comparator amplifier 96. The positive input of comparator amplifier 96 has a threshold for comparison purposes determined by adjustable resistance 97. Output for the present parity timer is taken from the output of amplifier 96.

A better understanding of the present invention will be had by virtue of the following description. Assume now that a tone is present from the associated high and low tone detectors at terminals H1 and L1 respectively. Also assume that all of the flip flop circuits 21–24 and 61–64 are in their reset condition. In response to the signal at terminal H1 the signal will be applied to the set(s) input of flip flop 21. The $\overline{Q}$ output of flip flop 21 will disappear and no signal will be present at the output of OR gate 19. Similarly a signal from the low group detectors at terminal L1 will turn flip flop 61 on and again no output will be present at gate 59. There being no output from gate 19 or 59 there will likewise be no output from gate 99 and thus no signal is present on the reset lead extending the parity timer 90.

With the presence of signals on terminals H1 and L1 signals will be conducted through associated parity timer gates 91 and 92 respectively to AND gate 93. There being a signal present on both of the inputs of gate 93, an output will be produced and through resistor 94 applied to capacitor 95. Capacitor 95 will start to charge. After its charging period, the signal will then be applied to the negative input of comparator amplifier 96, with the resultant signal exceeding the predetermined threshold applied through resistor 97 to the positive input of differentiator amplifier 96, causing an output signal to appear at the parity out terminal for connection to associated register equipment.

If, however, before capacitor 95 is fully charged (the charging period of capacitor 95 being the timing period for the present circuit) a new signal appears on lead H2 from the high group tone detectors flip flop 22 will be set and at the same time the signal on lead H2 will be through OR gate 11 applied to the reset input of flip flop 21. This action will cause an output at the $\overline{Q}$ output of flip flop 21 which will be differentiated by the resistor capacitor combination consisting of capacitor 31 and resistor 41. The effect of this differentiator circuit is to provide a pulse at the input of gate 19. The output from gate 19 will then be extended through gate 99 via the reset lead through diode 98 to capacitor 95 to discharge capacitor 95.

It will be obvious from the above that discharge of capacitor 95 before it is fully charged will prevent the negative input 96 reaching a point whereby amplifier 96 will be operated to produce the parity output signal. In this manner it will also be apparent that the present circuitry insures that not only two tones, but the same two tones, one in each group, are present for the entire parity timing period. If there is an interruption in the two tones, but the same two come back on before an interdigital pause is recognized, the parity timer will not be reset.

While but a single embodiment of the present invention has been shown, it will be obvious to those skilled in the art that numerous modifications may be made without departing from the spirit and scope of the present invention which shall be limited only by the claims appended hereto.

What is claimed is:

1. A parity checking circuit, connected to first and second groups of tone detector circuits for detecting the concurrent detection of a tone signal by each of said first and second tone detector circuits, comprising; timing means including, a plurality of first circuit inputs each connected to a different tone detector in said first group, a plurality of second circuit inputs each connected to a different tone detector in said second group, and an output, operated to generate an output signal in response to detection of a tone by a first one of said tone detectors in said first group coincident with detection of a tone by a first one of said tone detectors in said second group, said timing means output signal generated a predetermined period of time after said tone detections, to generate a parity signal at said output; a first latch circuit including a plurality of first circuit inputs each connected to a different tone detector in said first group, and a circuit output; a second latch circuit including a plurality of first circuit inputs each connected to a different tone detector in said second group, at an output circuit; and reset means including a first input connected to said first latch circuit, a second input connected to said second latch circuit and an output connected to said timing means, operated in response to detection of a tone by a second one of said tone detectors in either of said first or said second group to inhibit generation of said parity signal, until a predetermined time after detection of a tone by said second ones of said tone detectors.

2. A parity checking circuit as claimed in claim 1 wherein: said first and second latch circuits each include a plurality of bistable circuits each including a first circuit input connected to a different one of said tone detectors in said group of tone detectors connected to said latch, said bistable circuits operated to a first stable state in response to detection of a tone by said connected tone detector.

3. a parity checking circuit as claimed in claim 2 wherein: said first and second latch circuits each further include a plurality of gating circuits; and each of said bistable circuits further include a circuit output and a second circuit input; each of said gating means connected between the second circuit input of a different one of said bistable circuits and all of said tone detectors in said connected group except said tone detector connected to said first circuit input; said operated bistable circuit further operated to a second stable state in response to detection of a tone by any of said tone detectors connected through said gating means to said bistable circuit.

4. A parity checking circuit as claimed in claim 3 wherein: said first and second latch circuits each further include a gate circuit connected to said latch circuit output; and a plurality of integrating circuits, each connected between a different one of said bistable circuit outputs and said gate circuit; said integrating means operated in response to operation of said connected bistable circuit to said second stable state, to generate an output pulse for the transmission through said gate circuit to said latch circuit output.

5. A parity checking circuit as claimed in claim 4 wherein: said reset means include gating means connected between said first latch circuit output, said second latch circuit output and said timing means; said gating means operated to couple an output pulse from either said first or second latch circuit outputs to said timing means.

6. A parity checking circuit as claimed in claim 1 wherein; said timing means include a capacitor charged initially in response to co-incident detection of tones by one of said tone detectors in said first group and one of said tone detectors in said second group; and output signal generating means operated in response to charging of said capacitor to generate a parity signal at said timing means output.

7. A parity checking circuit as claimed in claim 6 wherein: said capacitor is discharged in response to operation of said reset means.

* * * * *